(12) United States Patent
Dotan et al.

(10) Patent No.: US 8,549,473 B2
(45) Date of Patent: Oct. 1, 2013

(54) CONFIGURATION MANAGEMENT SYSTEM FOR SOFTWARE PRODUCT LINE DEVELOPMENT ENVIRONMENT

(75) Inventors: Dolev Dotan, Bustan HaGalil (IL); Julia Rubin, Haifa (IL); Tali Yatzkar-Haham, Moshav Yaad (IL)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/110,953

(22) Filed: May 19, 2011

(65) Prior Publication Data

US 2012/0297361 A1 Nov. 22, 2012

(51) Int. Cl.
*G06F 9/44* (2006.01)

(52) U.S. Cl.
USPC ............ 717/110; 717/106; 717/121; 717/122

(58) Field of Classification Search
USPC .................................. 717/106, 110, 121, 122
See application file for complete search history.

(56) References Cited

U.S. PATENT DOCUMENTS

| | | | |
|---|---|---|---|
| 6,766,481 B2 * | 7/2004 | Estep et al. ................... | 717/124 |
| 8,146,075 B2 * | 3/2012 | Mahajan ....................... | 717/170 |
| 2009/0089753 A1 * | 4/2009 | Yoshimura et al. ............ | 717/121 |
| 2009/0164970 A1 * | 6/2009 | Gentry et al. ................. | 717/101 |
| 2009/0210853 A1 | 8/2009 | Kumar et al. | |
| 2010/0169326 A1 | 7/2010 | Ma et al. | |
| 2010/0171745 A1 * | 7/2010 | Bachrouch .................... | 345/441 |
| 2011/0202905 A1 * | 8/2011 | Mahajan ....................... | 717/140 |
| 2011/0209133 A1 * | 8/2011 | Mahajan et al. .............. | 717/170 |
| 2012/0017205 A1 * | 1/2012 | Mahajan ....................... | 717/170 |
| 2012/0159420 A1 * | 6/2012 | Yassin et al. .................. | 717/101 |

FOREIGN PATENT DOCUMENTS

| | | |
|---|---|---|
| JP | 2009053951 | 3/2009 |
| KR | 100836218 | 6/2008 |
| WO | 2007001108 | 1/2007 |

OTHER PUBLICATIONS

Hendrickson et al., "Modeling Product Line Architectures through Change Sets and Relationships", 2007.*
McGregor et al., "Testing a Software Product Line", 2010.*
Liguo Yu and Srini Ramaswamy, "A Configuration Management Model for Software Product Line", INFOCOMP Journal of Computer Science (2006).
Software Configuration Management for Product Derivation in Software Product Families—Cheng Thao, Ethan V. Munson, Tien N. Nguyen—15th Annual IEEE International Conference and Workshop on the Engineering of Computer Based Systems (ecbs 2008).

(Continued)

*Primary Examiner* — Phillip H Nguyen

(57) ABSTRACT

A system that includes: a configuration management system configured to receive resource updates submitted by developers of a product line; an update monitor configured, in manual monitoring, to mark each submitted resource update with respective variability data specified as relevant to the update submission, by the developer; and a tracer configured, in automatic monitoring, to trace portions of the updated resource into respective features or products of the product line, to determine variability data relevant to the update submission, wherein when an update request is initiated by the developer, the configuration management system is configured to associate the submitted resource updates with the update request based on common variability data, to provide resource updates on demand, based on variability data, wherein in automatic update, the configuration management system is configured to notify developers on resource updates, based on variability data common to the updated resource and the notified developers.

18 Claims, 3 Drawing Sheets

(56) References Cited

OTHER PUBLICATIONS

Mark C. Chu-Carroll et al., "Supporting aggregation in fine grained software configuration management", ACM SIGSOFT Software Engineering Notes vol. 27, Issue 6 (Nov. 2002).

Jilles van Gurp and Christian Prehofer, "Version management tools as a basis for integrating Product Deri-vation and Software Product Families"—Variability management—Working with Variability Mechanisms Proceedings of the Workshop held in Conjunction with the 10th Software Product Line Conference (SPLC-2006).

Roberto Silveira Silva Filho and David F. Redmiles, "Towards the Use of Dependencies to Manage Variability in Software Product Lines", Working with Variability Mechanisms Proceedings of the Workshop held in conjunction with the 10th Software Product Line Conference (SPLC-2006).

Michalis Anastasopoulos and Dirk Muthig, "An Evaluation of Aspect-Oriented Programming as a Product Line Implementation Technology", Lecture Notes in Computer Science vol. 3107/2004, 2004.

Cheng Thao et al., "Software Configuration Management for Product Derivation in Software Product Families", 2008 IEEE.

Mark Staples, "Change Control for Product Line Software Engineering", Proceedings of the 11th Asia-Pacific Software Engineering Conference, 2004.

* cited by examiner

CONFIGURATION MANAGEMENT SYSTEM FOR SOFTWARE PRODUCT LINE DEVELOPMENT ENVIRONMENT

BACKGROUND

1. Technical Field

The present invention relates to software development environment and more particularly, to applying configuration management concepts to software product line development.

2. Discussion of the Related Art

The challenges of the customer-driven environment in software development are targeted by most companies by creating a product line, being a portfolio of closely related products with variations in features and functions—rather than just a single product. When developing a product line resource, such as the product line code, each piece of code that implements one or more features is marked with the feature it implements. This applies when developing other product line resources such as requirements, tests and so forth.

In order to define specific product out of the product line platform, the required features for this specific product are chosen from the feature model. This list of selected features defines the product. According to the selected features, a specific product can be materialized out of the product line platform by taking only the artifacts that are marked with the product selected features, and not taking other resources.

Software development today is carried out by teams, wherein in each team several developers work concurrently and independently on products of a common product line. When the development is done by teams, a source control tool that manages the evolution of resources over time is crucial. A developer may, at any given time, ask to see updates that were entered by the rest of the team.

When working according to the product line concept described above using a source control, some of the changes can be made directly on the product line context, where all the artifacts of all the products are presented, while other changes may be performed on specific product views. Performing changes on a specific product view is sometimes more convenient since the developer is presented with the relevant artifacts only. This might be much easier to a developer that needs to upgrade a specific product he or she is familiar with.

Currently, when developers wish to work on specific product, they may ask to see updates and in response, they will get all the updates that were made to the product line. In other words, they will be working on the product line in its entirety and get all updated relevant to all products and features, no matter if this change is relevant to their product or not.

BRIEF SUMMARY

One aspect of the invention provides a system that may include the following components: a configuration management system configured to receive resource updates submitted by developers associated with a product line software development environment; an update monitor configured, in a case of manual monitoring, to mark each submitted resource update with respective variability data specified as relevant to the update submission, by the developer; and a tracer configured, in a case of automatic monitoring, to trace portions of the updated resource into respective features or products of the product line, to determine variability data relevant to the update submission, wherein in a case an update request is initiated by the developer, the configuration management system is configured to associate the submitted resource updates with the update request based on common variability data, to provide resource updates on demand, based on variability data, wherein in a case of automatic update, the configuration management system is configured to notify one or more developers with resource updates, based on variability data common to the updated resource and the notified developers.

Other aspects of the invention may include a method arranged to execute the aforementioned system and a computer readable program configured to execute the aforementioned system. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
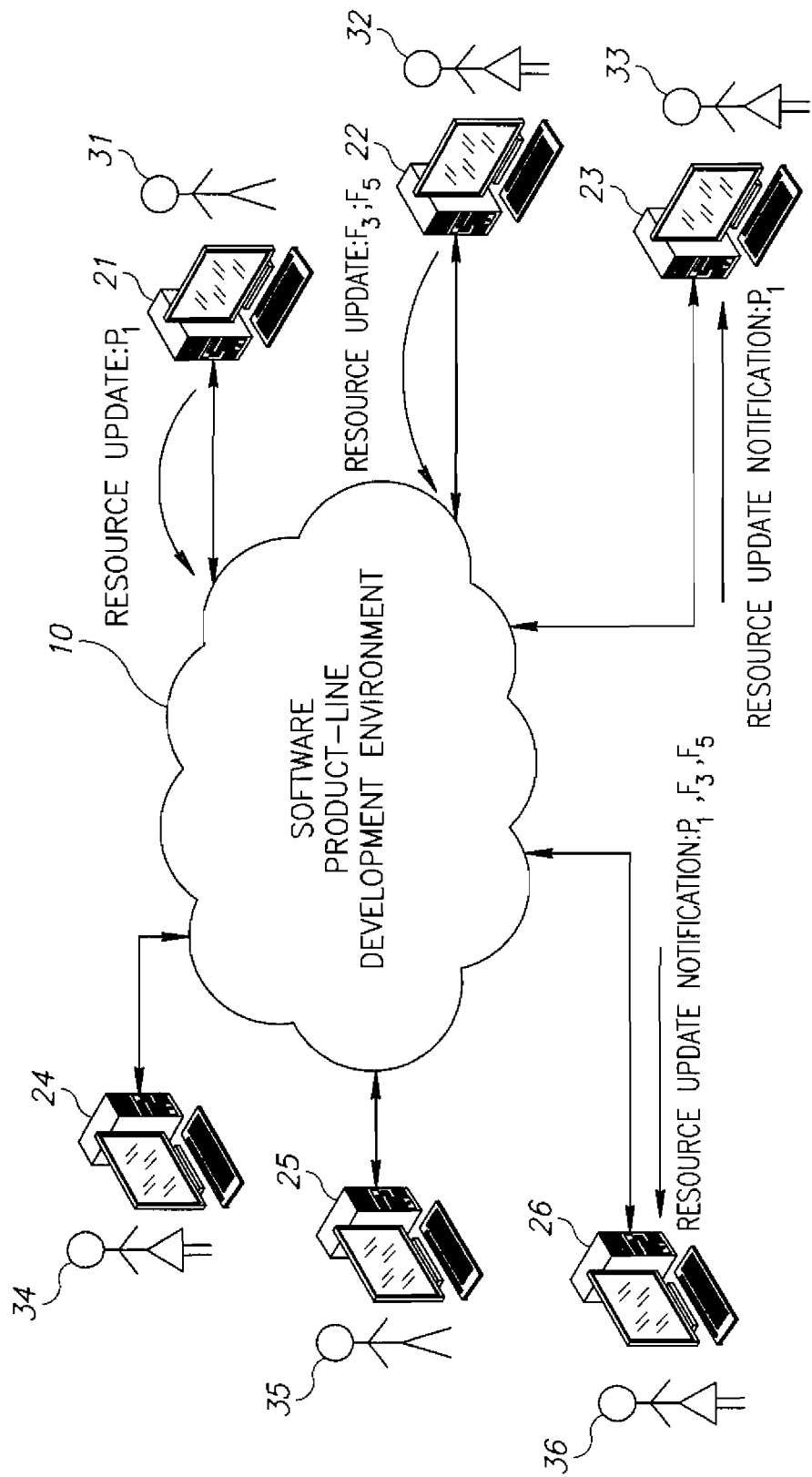
FIG. 1 is a high level schematic block diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "software product line engineering" or simply "product line" as used herein in this application refers to software engineering methods, tools and techniques for creating a collection of similar software systems from a shared set of software assets using a common means of production. The product line can be described by a set of features, and constraints on these features selections. The features may be modeled by a feature model that defines the features and constraints among the feature selection for any valid product. In this feature model, each one of the feature is associated with variability data which characterizes the type of variations each feature can be represented in a product configuration. Exemplary feature variability data may include the following types: (1) mandatory—which means that they must be part of any product in the product line, (2) optional—which means that there present in a product is optional, (3) alternative—which means that exactly one feature from a group must be in every product. Other variability types as well as other constraints, among feature selection and grouping can also be defined in the feature model.

The term "configuration management system" as used herein in this application refers to a computerized tool configured to establish and maintain consistency of the performance, functional attributes, and physical attributes of a product or a product line with its requirements, design, and operational information throughout its life cycle. One non-limiting example for a configuration management system is a source control for computer source code in a software development environment. Other examples may be requirements management systems such as DOORS™ which is provided with its own version management for the resources. It is noted that other types of configuration management systems may exist.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an environment of a system according to some embodiments of the invention. A software product-line development environment 10 (hereinafter, development environment) according to embodiments of the present invention is shown. A plurality of developer computers 21-26 (such as personal computers) is connected to development environment 10, possibly via a computer network (not shown). Respective developers 31-36 are each associated with one of developer computers 21-26. During the course of development of a product line, each one of developers 31-36 may work on a specific product from the product line, on the product line itself, or on a group of features. While working, the developer may wish to submit changes or updates to resources he or she uses. For example, developer 32 may wish to update the code portion or requirements she currently works on, which happens to be relevant to features $F_3$ and $F_5$. According to the present invention, any submission of a product-line related update is examined by the source control. In some embodiments, the submitted update is monitored automatically to trace and detect the variability data associated with the update submission. In other embodiments, the developer is enabled to specify during the submission of an update, the variability data associated with the submission.

Then, in case an update on demand is required, each developer may issue an update request. In response, he or she may receive only the updates that are relevant to the resources they work on. In other embodiments, developers may receive notification as to updates that are relevant to the resources they work on.

For example, developer 33 uses product $P_1$ and so she is associated with any update on any code, requirement, or test update relating to product $P_1$. Developer 33 may further be notified regarding this update either automatically or in response to an inquiry made by her. Similarly, developer 36 may use product P2 that is associated with the feature of $P_1$ with the addition of $F_3$, $F_5$ and so if and when she issues an update request, she receives a resource update on demand including any type of update relating to product $P_1$ and features $F_3$ and $F_5$.

Advantageously, embodiments of the present invention enable a team of developers 31-36 to develop several different products of the product line by making the source control tool aware of the product line information.

Figure 2:
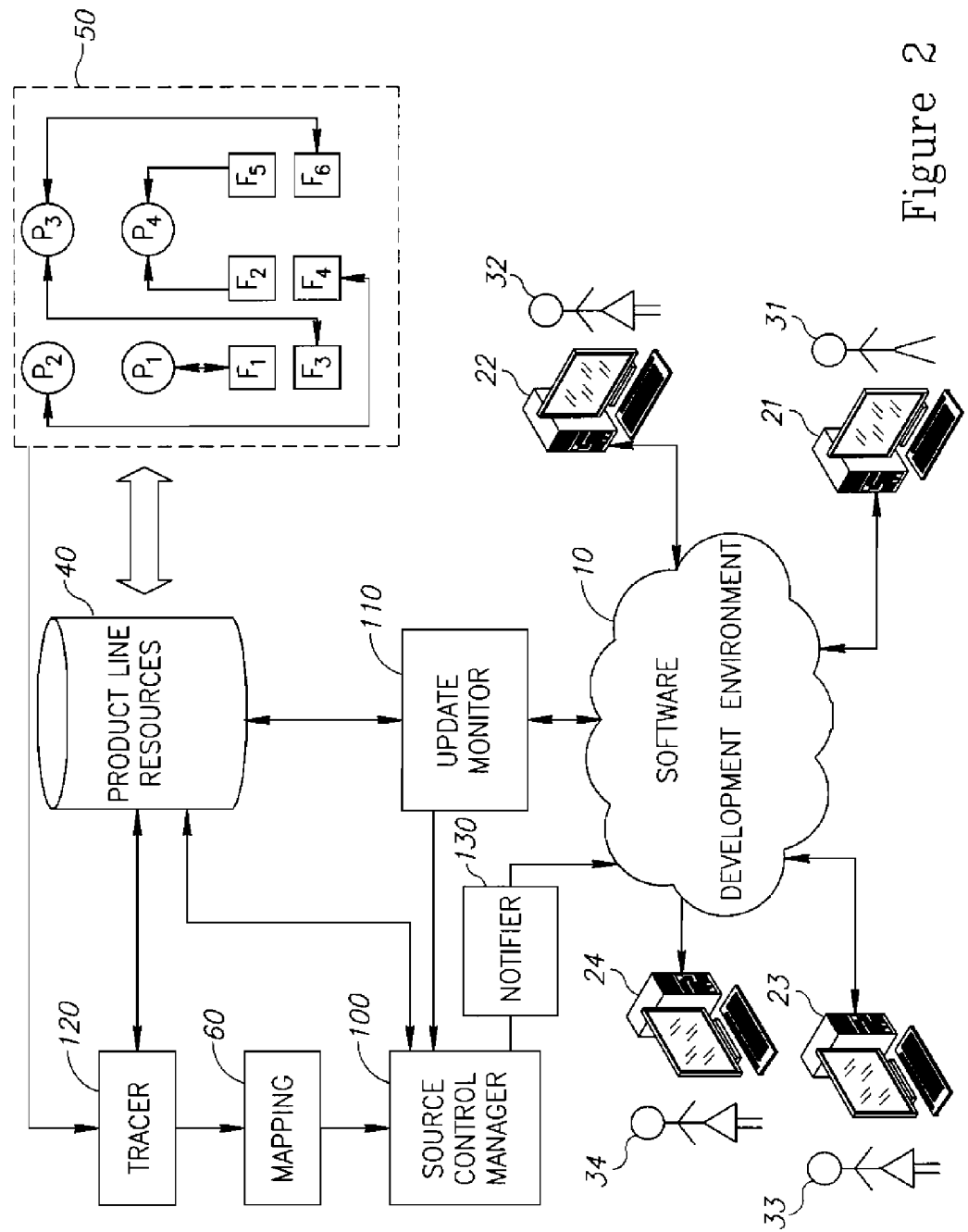
FIG. 2 is a high level schematic block diagram illustrating the system according to some embodiments of the invention.

FIG. 2 is a high level schematic block diagram illustrating in further details aspects of development environment 10 according to some embodiments of the invention. As explained above, software product line development environment 10 is associated with product line resources 40 associated in turn with a plurality of products $P_1$-$P_4$ each associated with one or more features $F_1$-$F_6$. Resources 40 may include any source code, scripts, requirements, tests, and the like. The aforementioned products and features are associated between them in a set of relationships constituting a feature model 50. A plurality of developer computers 21-24, each in communication with development environment 10 are configured to enable respective developers 31-34 to open a session and work independently on product development that involves, inter alia, resource revising and submission of resource updates. Each one of developer computers 21-24 is further configured to enable a developer to specify, upon submission of a resource update, which products and/or features, the resource update refer to. Development environment 10 is further operatively associated (or contains) an update monitor 110 and a configuration management system 100.

In operation, update monitor 110 is configured to receive resource updates submitted by developers 31-34 associated with a product line software development environment 10. Update monitor 110 may be configured, in a case of manual monitoring, to mark each submitted resource update with respective variability data specified as relevant to the update submission, by the developer over their computers. Tracer 120 may be configured, in a case of automatic monitoring, to trace portions of the updated resource into respective features or products of the product line, to yield mapping 60 usable to determine variability data relevant to the update submission.

Then, in a case an update request is initiated by a developer, the configuration management system is configured to associate the submitted resource updates with the update request based on common variability data, to provide resource updates on demand, based on variability data. In a case of automatic update, configuration management system 100 is configured to notify, possibly via notifier 130 one or more developers on resource updates, based on variability data common to the updated resource and the notified developers.

Consistent with some embodiments of the invention, the product line data specified by any one of the developers comprises a list of one or more features associated with the product line, and wherein the configuration management system is further configured to notify only the developers whose active session on the product line development environment is associated with products containing at least one of the features on the list. Additionally and alternatively, in case a developer is working on a specific product, he or she may be associated (and possibly notified via notifier 130) with updates relevant to any feature of his or her product's features. An update can be marked with a product (and not a feature list) this way, only developers working on this product would get this update. This last feature may be very useful when it is clear that this update is relevant to the specific product only, and should not affect other products. In this case, developers of other products, and the developers of the product line platform are not presented with the update.

Consistent with some embodiments of the invention, the variability data may be indicative of a type of variations of features within a feature model 50 representative of the product line. Specifically, the variability data may include any of the following types of variability characterizing features of the product line: mandatory, optional, alternative, and mutual exclusive.

Consistent with some embodiments of the invention, the tracing by tracer 120 is carried out based on a feature model 50 of the product line, usable to determine of relevance of a specified portion of a resource to variability data associated with the resource update.

Consistent with some embodiments of the invention, any one of the resource update may relate to any of the following aspects of the product line: one or more features associated with the product line, one or more products of the product line, and the product line in its entirety.

Figure 3:
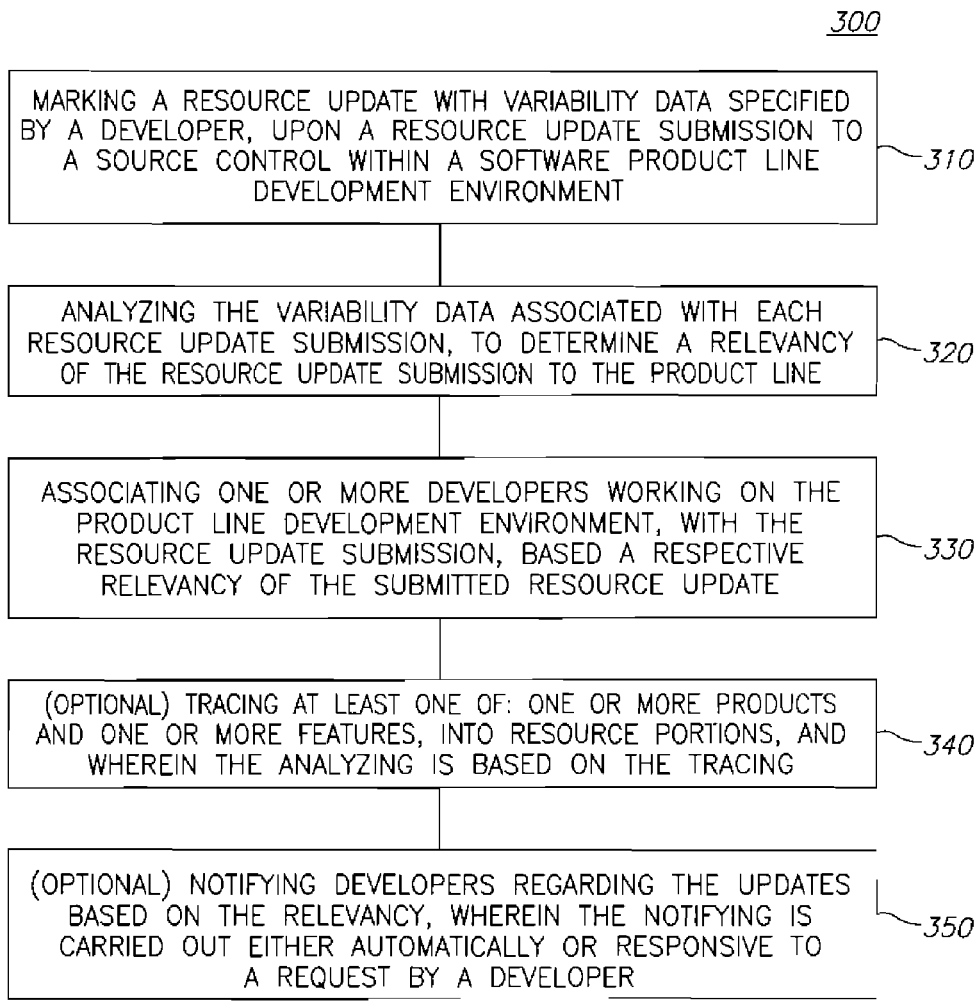
FIG. 3 is a high level flowchart diagram illustrating a method according to some embodiments of the invention.

FIG. 3 is a high level flowchart diagram illustrating a method according to some embodiments of the invention. Method 300 is not limited to the aforementioned architecture of development environment 10. However, for the sake of simplicity, the stages of method 300 will be described herein in conjunction with components of development environment 10. Method 300 starts 310 with receiving a resource update submitted by developers 31-34 to a configuration management system 100 associated with a product line software development environment 10. The type of update monitoring is then checked 320. In a case of manual monitoring, marking, possibly via developer computers 21-24 and update monitor 110, the submitted resource update with variability data specified as relevant to the update submission, by the developers 31-34, 332. In a case of automatic monitoring, tracing portions, possibly by tracer 120 of the updated resource into respective features or products of the product line, to determine variability data relevant to the update submission 334. Then, two scenarios related to the initiative for an update requests checked 340. In a case an update request is initiated by the developer, associating submitted resource updates with the update request, based on common variability data, to provide resource updates on demand, based on the variability data 352. In a case of automatic update, notifying one or more developer with resource updates, based on variability data common to the updated resource and the notified developers 354.

Advantageously and as illustrated above, embodiments of the present invention introduce product line awareness to a configuration management system such as a source control tool which allows it to present only relevant changes and updates to the product line developers. Thus, challenges of resource control management in a product line environment are solved in a more efficient manner.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    receiving a resource update submitted by a developer to a configuration management system associated with a product line software development environment;
    in a case of manual variability annotation, the submitted resource update is marked by the developer with variability data; and
    in a case of automatic variability annotation, utilizing variability annotations associated with changed portions of the updated resources, to mark the submitted resource update with variability data;
    providing at least some of the received updates to developers on the team according to the product or features they are working on;
    in a case an update request is initiated by the developer, addressing the request with resource updates, based on variability data common to the updated resource and the request; and
    in a case of automatic update, notifying one or more developers with resource updates, based on variability data common to the updated resource and the notified developers,
    wherein at least one of: the receiving, the marking, and the providing is in operative association with at least one processor.

2. The method according to claim 1, wherein the product line resources comprise at least one of: computer codes, requirements, design specifications using documents or models, and tests.

3. The method according to claim 2, wherein the variability data is associated with features within a feature model representative of the product line.

4. The method according to claim 3, wherein the variability comprises at least one of: optional, alternative, and mutual exclusive.

5. The method according to claim 1, wherein the marking is carried out based on a feature model of the product line, indicative of relevance of a specified portion of a resource to variability data associated with the resource update.

6. The method according to claim 1, wherein the resource update relates to at least one of: (i) one or more features associated with the product line, (ii) one or more products of the product line, and (iii) the product line in its entirety.

7. A system comprising:
  a configuration management system configured to receive resource updates submitted by developers associated with a product line software development environment;
  an update monitor configured, in a case of manual variability annotation, to allow the developer to mark each submitted resource update with respective variability data specified as relevant to the update submission; and
  a tracer configured, in a case of automatic variability annotation, to trace portions of the updated resource into respective features or products of the product line, to determine variability data relevant to the update submission,
  wherein in case an update request is initiated by the developer, the configuration management system is configured to provide as response only those resource updates which fit the variability data specified in the request, based on the variability data associated with the resource updates,
  wherein in a case of automatic update, the configuration management system is configured to notify one or more developers on resource updates, based on variability data common to the updated resources and the notified developers,
  wherein the configuration management system, the update monitor, and the tracer, are in operative association with at least one processor.

8. The system according to claim 7, wherein the product line resources comprise at least one of: computer codes, requirements, design specifications using documents or models, and tests.

9. The system according to claim 8, wherein the variability data is associated with features within a feature model representative of the product line.

10. The system according to claim 9, wherein the variability data comprises at least one of: mandatory, optional, alternative, and mutual exclusive.

11. The method according to claim 1, wherein the automatic variability annotation is carried out based on the feature model of the product line, indicative of relevance of a specified portion of a resource to variability data associated with the resource update.

12. The method according to claim 1, wherein the resource update relates to at least one of: (i) one or more features associated with the product line, (ii) one or more products of the product line, and (iii) the product line in its entirety.

13. A computer program product, the computer program product comprising:
  a computer readable storage medium having computer readable program embodied therewith, the computer readable program comprising:
  computer readable program configured to receive resource updates submitted by developers associated with a product line software development environment;
  computer readable program configured, in a case of manual variability annotation, to allow the developer to mark each submitted resource update with respective variability data specified as relevant to the update submission;
  computer readable program configured, in a case of automatic variability annotation, to trace portions of the updated resource into respective features or products of the product line, to determine variability data relevant to the update submission;
  computer readable program configured, in a case an update request is initiated by the developer, to provide as response only those resource updates which fit the variability data specified in the request, based on the variability data associated with the submitted resource updates; and
  computer readable program configured, in a case of automatic update, to notify one or more developers on resource updates, based on variability data common to the updated resource and the notified developers.

14. The computer program product according to claim 13, wherein the product line resources comprise at least one of: computer codes, design specifications using document or models, requirements, and tests.

15. The computer program product according to claim 14, wherein the variability data is associated with features within a feature model representative of the product line.

16. The computer program product according to claim 15, wherein the variability data comprises at least one of: mandatory, optional, alternative, and mutual exclusive.

17. The computer program product according to claim 13, wherein the tracing is carried out based on a feature model of the product line, indicative of relevance of a specified portion of a resource to variability data associated with the resource update.

18. The computer program product according to claim 13, wherein the resource update relates to at least one of: (i) one or more features associated with the product line, (ii) one or more products of the product line, and (iii) the product line in its entirety.

* * * * *